United States Patent [19]

Mordue et al.

[11] Patent Number: 5,028,211

[45] Date of Patent: Jul. 2, 1991

[54] TORQUE COUPLING SYSTEM

[75] Inventors: George S. Mordue, Ravenna; Herbert L. Ritchie, Jr., North Ridgeville, both of Ohio

[73] Assignee: The Carborundum Company

[21] Appl. No.: 315,533

[22] Filed: Feb. 24, 1989

[51] Int. Cl.$^5$ ............................................. F01D 5/30
[52] U.S. Cl. ............................... 416/204 R; 403/356; 403/318
[58] Field of Search ................. 416/204 R; 403/356, 403/358, 318; 464/136

[56] References Cited

U.S. PATENT DOCUMENTS

| | | | |
|---|---|---|---|
| 1,842,213 | 1/1932 | Smellie | 415/229 |
| 1,993,268 | 3/1935 | Ferguson | 415/56.2 |
| 2,934,245 | 4/1960 | Emeny | 415/200 |
| 3,048,384 | 8/1962 | Sweeney et al. | 415/217.1 |
| 3,128,084 | 4/1964 | Castor | 416/179 |
| 4,465,395 | 8/1984 | Mullenberg | 403/356 |
| 4,786,230 | 11/1988 | Thut | 415/121.2 |
| 4,846,763 | 7/1989 | Di Stefano | 464/136 |

*Primary Examiner*—John T. Kwon
*Attorney, Agent, or Firm*—Weston, Hurd, Fallon, Paisley & Howley

[57] ABSTRACT

A torque coupling system includes an impeller that is connected to one end of an impeller shaft without the use of threads. The connection is made by cement and dowels. A drive system for the shaft includes a hollow coupling into which the other end of the shaft can be fitted. The shaft includes longitudinally extending slots formed at its end. The coupling includes spaced, longitudinally extending keys adapted to be fitted into the slots formed in the shaft. The drive system also includes a torque limiter that is connected intermediate the coupling and a drive motor. If the drive motor is an electric motor, the motor can be provided with automatic shut-down circuitry that is activated in the event of a current/torque overload. Visual and aural alarms are provided to alert the user that a shut-down has occurred.

12 Claims, 6 Drawing Sheets

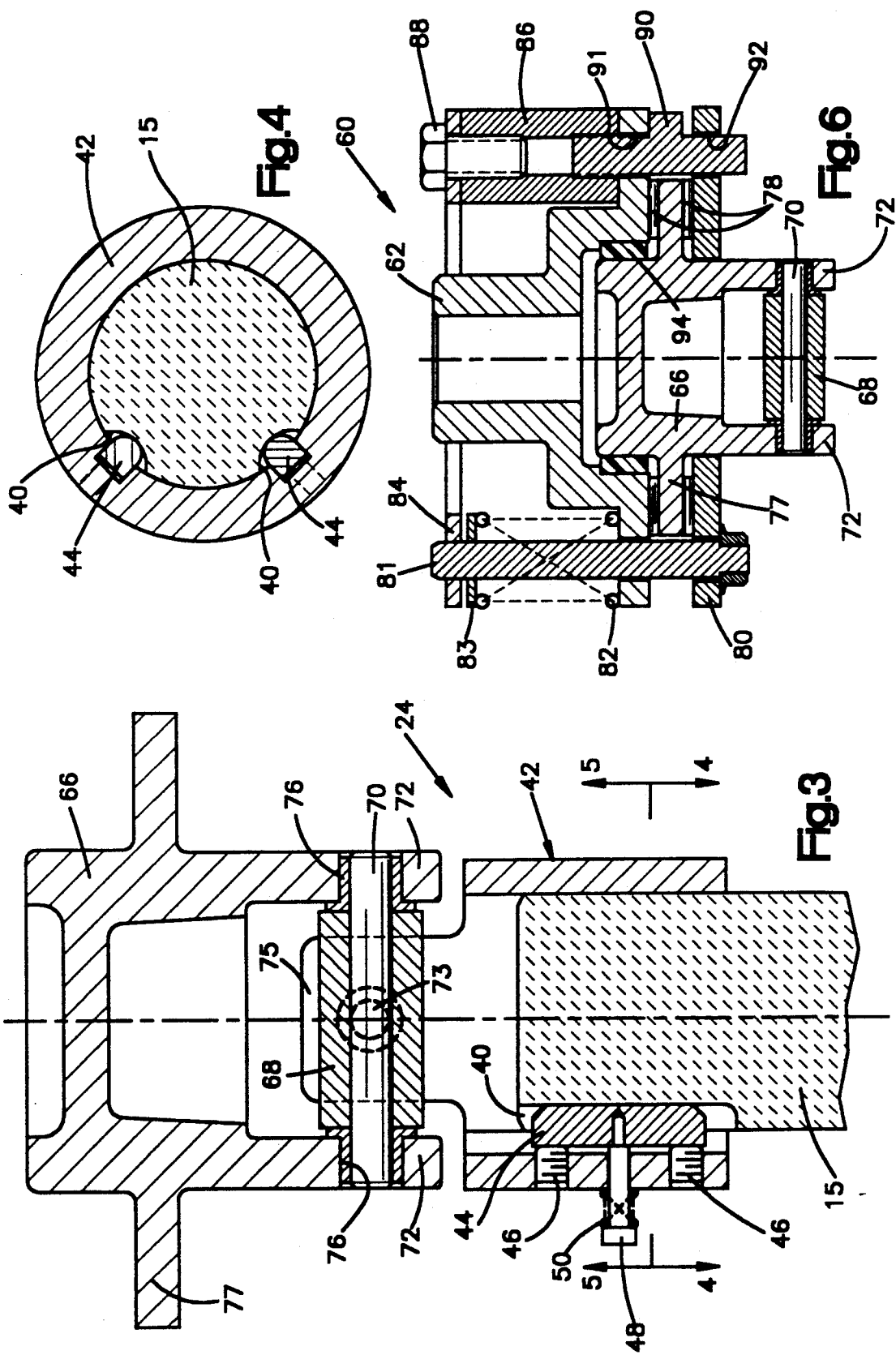

TORQUE COUPLING SYSTEM

BACKGROUND OF THE INVENTION

1. Field of the Invention

The invention relates to impeller shafts and, more particularly, to the construction of such shafts and to a drive system that (a) enables the shafts to be connected or disconnected quickly and (b) prevents the shafts from being fractured by excessive torque loads.

2. Description of the Prior Art

Impeller shafts are used in a variety of applications such as molten metal pumps, mixers, dispersers, and other equipment. In particular, impeller shafts made of graphite are used in environments that are hostile to shafts made of other materials. An especially desirable use for graphite shafts is that of supporting rotatable impellers in molten metal pumps. Properly treated, graphite is an oxidation-resistant material that enables the shafts to be effective in withstanding attack by corrosive substances such as molten aluminum.

A problem with graphite shafts is that they are not very strong. Consequently, it is difficult to work with them and they must be handled carefully. In particular, it is relatively difficult to form threads on the shafts. Another drawback of graphite shafts relates to the technique by which they are connected to drive motors and impellers. It is conventional to connect a graphite shaft to a drive motor by threading the shaft into a connector connected directly or indirectly to the motor. Unfortunately, the shaft cannot be adjusted axially relative to the drive motor because the threaded end of the shaft is bottomed out upon connection to the drive motor. The same problem occurs when an impeller is threaded onto the other end of the shaft. Additionally, after the shaft has been used, torque that has been transmitted to the shaft during use will cause the shaft to be very tightly connected to the drive motor and the impeller such that the components cannot be separated easily. In extreme cases, it is necessary to destroy the shaft or the impeller in order to separate them from each other or to remove the shaft from the drive motor.

An additional problem related to graphite shafts is that they frequently are fractured in use due to excessive torque loads that are applied to the shafts. In the particular instance of graphite shafts used in molten metal pumps, it sometimes happens that foreign objects are ingested into the pumps. In this circumstance, an excessive torque load may be applied to the shafts, resulting in catastrophic failure of the shafts.

Desirably, an impeller shaft would be available that would enable the impeller to be easily connected to the shaft with minimal machining of the shaft and the impeller, and which would have superior strength characteristics. Another advantageous feature would be a drive motor-impeller shaft connection that would permit the shaft to be connected and disconnected easily from the drive motor without requiring excessive handling or machining of the shaft. Additionally, it would be desirable to have a drive motor-impeller shaft connection that would prevent catastrophic shaft failure upon the intermittent application of excessive torque loads.

SUMMARY OF THE INVENTION

The present invention provides a new and improved torque coupling system that addresses the foregoing concerns. An impeller shaft according to the invention is an elongate, cylindrical member that at one end is adapted to receive an impeller or other element, such as a rotor, and is adapted at its other end to be connected to a drive motor. The shaft requires minimal machining, and it completely avoids the use of threads. The impeller-shaft connection is made by providing an opening through the center of the impeller and placing the shaft in the opening. The impeller is cemented to the end of the shaft to prevent axial separation. Relative rotational movement is prevented by drilling axial holes into the shaft and the impeller at the intersection between the shaft and the impeller, and by thereafter placing dowels into the holes. The dowels serve as keys to prevent relative rotational movement between the impeller and the shaft. At its other end, the shaft is provided with longitudinally extending slots on its outer surface.

The drive system according to the invention includes a hollow coupling having first and second ends and defining a longitudinal axis of rotation. The first end is adapted to be connected directly or indirectly to a drive motor and the second end is adapted to be connected to the non-impeller end of the impeller shaft. The second end of the coupling includes a generally cylindrical opening into which the shaft can be fitted. A key is disposed within the opening in engagement with the adapter, the key having a longitudinal axis that is aligned with the longitudinal axis of the adapter. The adapter includes compression means for urging the key into contact with one of the slots in the shaft, as well as retaining means for urging the key out of contact with the shaft. The retaining means is weaker than the compression means such that the key can be brought into contact with the shaft but, upon releasing the compression means, the key will be moved out of contact with the shaft.

The invention also includes a torque limiter disposed intermediate the shaft and the drive motor. The torque limiter includes an input hub connected to the motor, and an output hub connected to the coupling. The input and output hubs are connected by means of a friction disc and a pressure plate. The disc and plate are spring-biased toward each other in order to permit the input and output hubs to move relative to each other whenever a predetermined torque load is exceeded. If the drive motor is an electric motor, the control circuitry for the motor can be adapted such that power to the motor will be halted whenever a predetermined current/torque overload is attained. Visual and aural alarms will be activated to alert the user to the existence of a shut-down.

By use of the present invention, damage to the impeller shaft is eliminated or substantially reduced, in part because it is easy to machine the longitudinally extending slots in the shaft, and in part because the torque limiter prevents catastrophic failure of the shaft. The impeller and the shaft can be connected easily and quickly, and the resultant connection is very strong. The particular construction of the coupling enables the shaft to be connected and disconnected from the drive motor quickly.

The foregoing and other features and advantages of the invention are illustrated in the accompanying drawings and are described in more detail in the specification and claims that follow.

BRIEF DESCRIPTION OF THE DRAWINGS

FIG. 3 is an enlarged view of a portion of the impeller shaft and a coupling according to the invention;

FIG. 4 is a cross-sectional view of a portion of the impeller shaft and the coupling according to the invention taken along a plane indicated by line 4—4 in FIG. 3;

FIG. 6 is a cross-sectional view of a torque limiter employed as part of the drive system according to the invention;

DESCRIPTION OF THE PREFERRED EMBODIMENT

Figure 1:
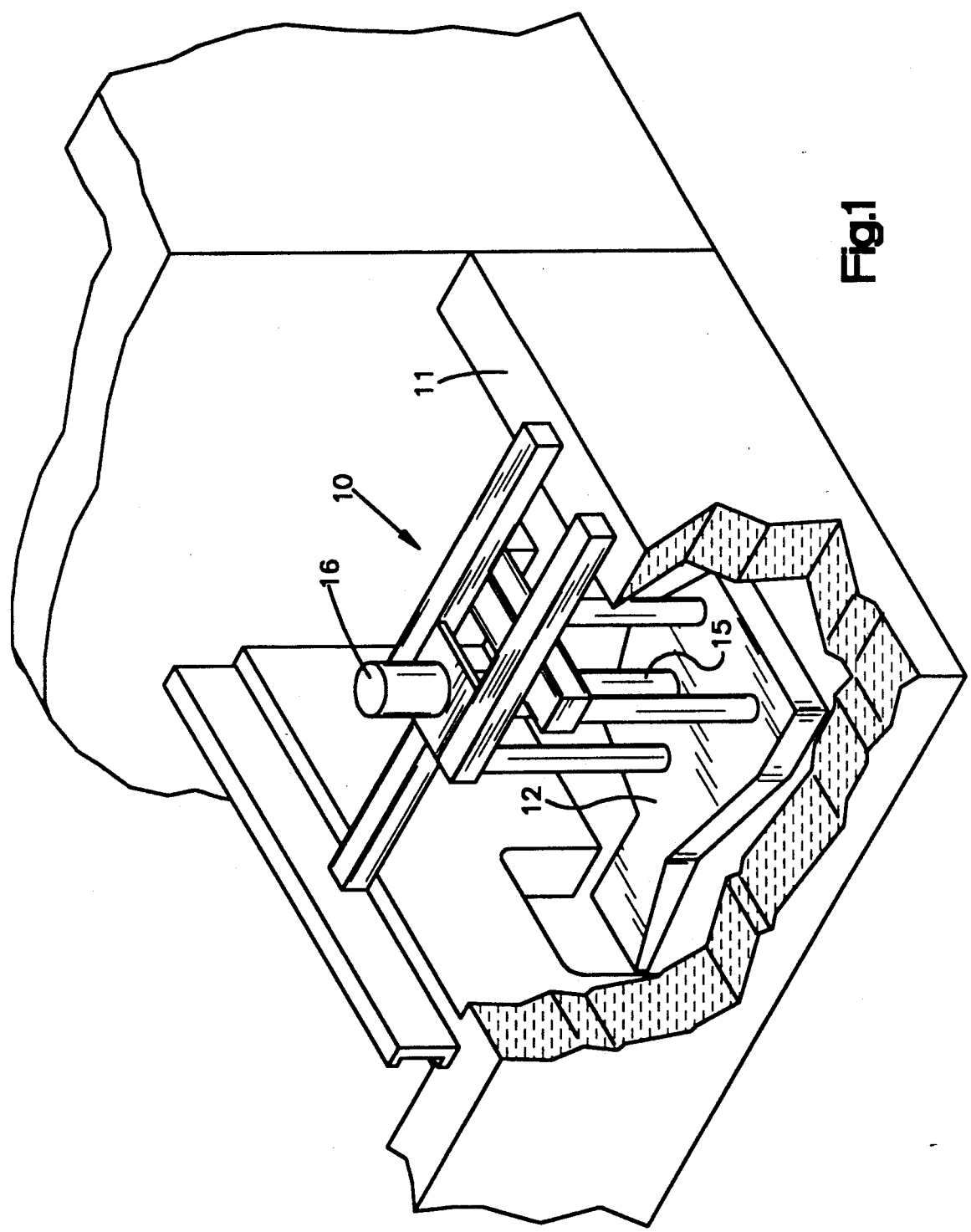
FIG. 1 is a schematic, perspective view of a molten metal pump, showing an impeller shaft and drive system according to the invention.

Referring to FIG. 1, a molten metal pump 10 is indicated generally by the reference numeral 10. The pump 10 is adapted to be immersed in molten metal contained within a vessel 11. The vessel 11 can be any container containing molten metal; in FIG. 1 the vessel 11 is the external well of a reverberatory furnace.

It is to be understood that the pump 10 can be any type of pump suitable for pumping molten metal. Generally, however, and as particularly shown in FIG. 2, the pump 10 will have a base member 12 within which an impeller 13 is disposed. The impeller 13 includes a plurality of radially extending openings 14. The impeller 13 is supported for rotation within the base member 12 by means of an elongate, rotatable shaft 15. The upper end of the shaft 15 is connected to a motor 16. The motor 16 can be of any desired type.

The base member 12 includes a pumping chamber 17 and an outlet passageway 18 in fluid communication with the chamber 17. Because the passageway 18 is disposed beneath the upper surface of the molten metal, the pump 10 functions as a so-called circulation pump, that is, it circulates molten metal within the vessel 11. As indicated earlier, however, the pump 10 is described for illustrative purposes and it is to be understood that the pump 10 can be of any type suitable for the pumping of molten metal.

A baffle plate 19 is connected to the upper portion of the base member 12 and is spaced therefrom a small distance in order to define a fluid inlet 20. The baffle plate 19 is supported by a shaft bearing mount 21. A bearing ring 22 of silicon carbide or other material having bearing properties at high temperature is disposed within the bearing mount 21. In like manner, a second bearing ring 23 of silicon carbide or other material having bearing properties at high temperature is disposed at the lowermost end of the base member 12 in facing relationship to the lowermost end of the impeller 13.

The shaft 15 typically is formed of graphite. It is to be understood that the present invention is especially effective with shafts made of graphite; however, the invention is usable with shafts made of other materials such as ceramic or coated metal. The use of the phrase "graphite shafts" herein is intended to encompass all such materials, where the use of such materials would be appropriate.

The first, or upper end of the shaft 15 is indicated by the reference numeral 24. The second, or lower end of the shaft 15 is indicated by the reference numeral 26. The first end 24 is adapted to be connected to the drive motor 16, while the second end 26 is adapted to be connected to the impeller 13.

Figure 9:
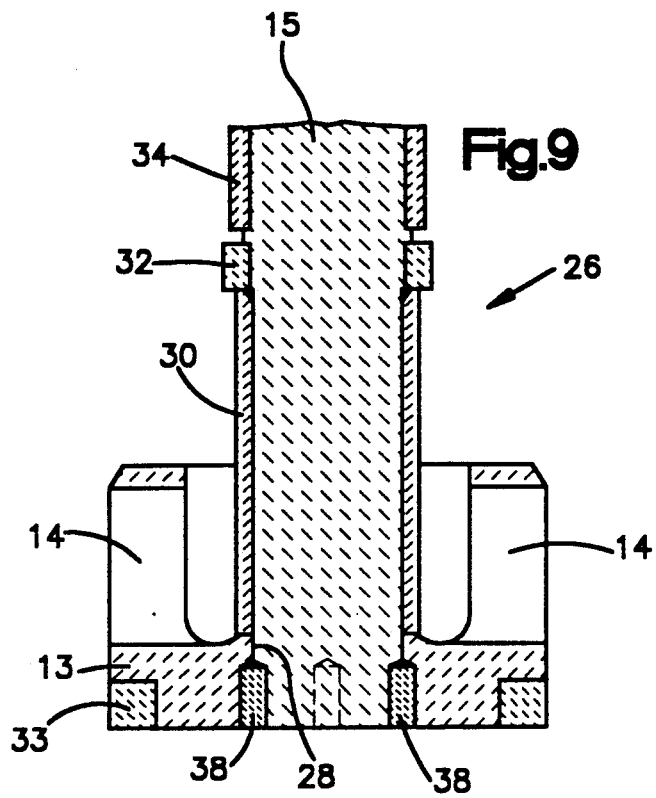
FIG. 9 is a cross-section view of the impeller shaft according to the invention taken along a plane indicated by line 9—9 in FIG. 8.
Figure 7:
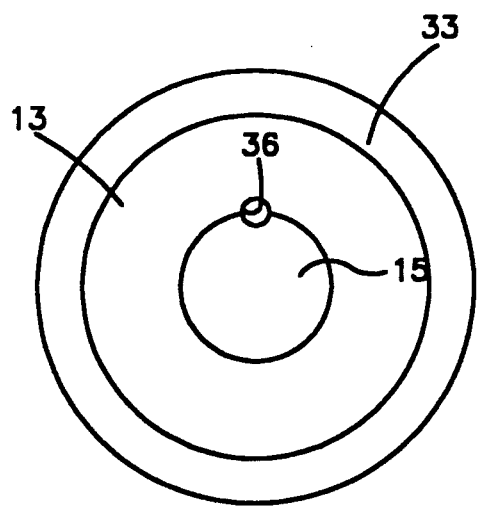
FIG. 7 is a bottom plan view of the impeller shaft according to the invention.
Figure 8:
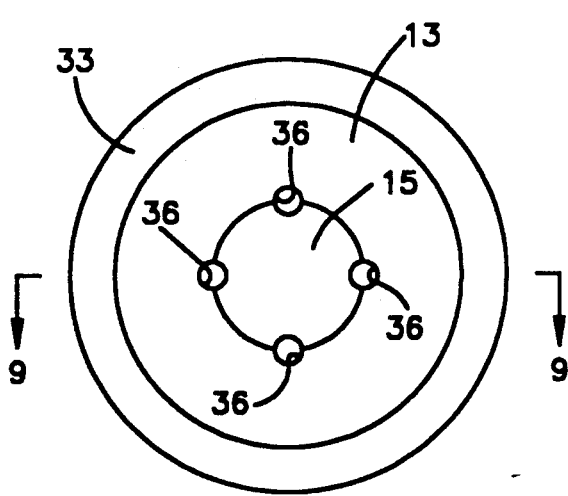
FIG. 8 is a view similar to FIG. 7 showing an alternative embodiment of the impeller shaft according to the invention.

Referring particularly to FIGS. 7-9, the second end 26 is generally cylindrical, and is received within a cylindrical opening 28 formed in the impeller 13. A cylindrical sleeve 30 is disposed about the lower end 26. The upper end of the sleeve 30 engages a bearing ring 32 which is axially fixed relative to the shaft 15. A bearing ring 33 is disposed about the lowermost end of the impeller 13. The bearing rings 32, 33 are made of silicon carbide or other material having bearing properties at high temperature. The bearing rings 32, 33 in use are disposed in facing relationship to the bearing rings 22, 23, respectively.

A second sleeve 34 is disposed about the shaft 15 at a vertical location above the ring 32. As is indicated in FIG. 9, the sleeve 30 not only serves to space the impeller 13 at a proper axial location relative to the shaft 15, but it also serves to maintain the axial location of the bearing ring 32 relative to the base member 12. The sleeve 30 provides mechanical support for the bearing ring 32. In use, the bearing 32 is subjected to various stresses. The sleeve 30 helps to reduce premature failures of the bearing ring 32.

The impeller 13, the sleeves 30, 34, and the bearing ring 32 are secured to the second end 26 by means of refractory cement such as FRAXSET commercially available from Metaullics Systems of Solon, Ohio. The refractory cement prevents relative axial movement between the impeller 13 and the shaft 15. In order to prevent relative rotational movement between the impeller 13 and the shaft 15, an opening 36 (FIG. 7) is formed in the impeller 13 and the shaft 1 at the interface between the two. The opening 36 is aligned with the longitudinal axis of the shaft 15. If desired, a plurality of openings 36 (FIG. 8) can be provided. Dowels 38 (FIG. 9) are inserted into the openings 36 and retained there by means of refractory cement. The dowels 38 thus function as keys.

As illustrated, the shaft 15 is cylindrical and the second end 26 is received within a cylindrical opening 28 by means of a non-threaded connection. It will be appreciated that the second end 26 could take other configurations such as splined, "square drive," and other non-cylindrical forms. A cylindrical configuration as previously described is preferred, however, for a variety of reasons, including the ready availability of cylindrical shafts and the simplicity and strength of the previously described shaft-impeller connection.

Figure 5:
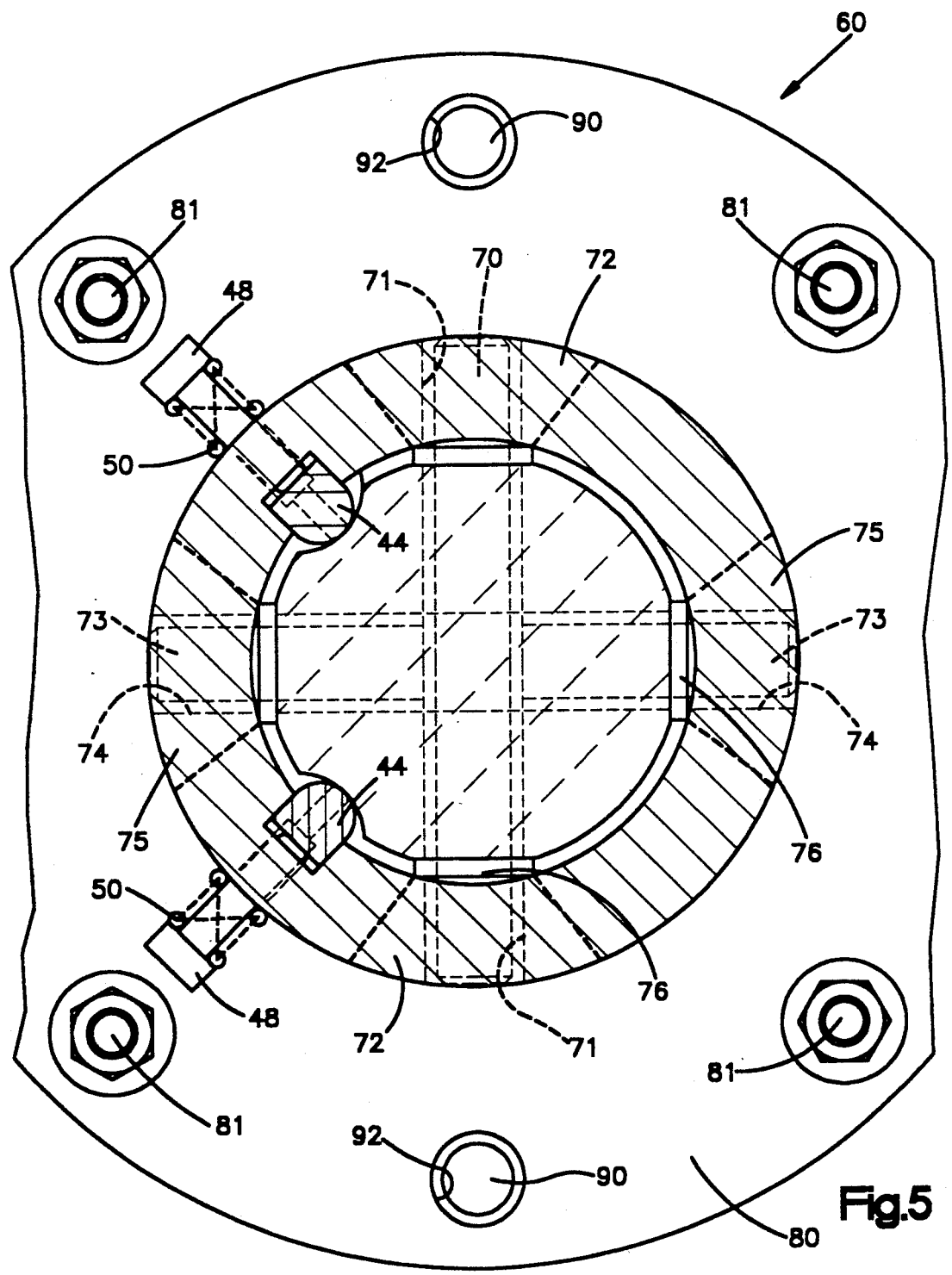
FIG. 5 is a view similar to FIG. 4 taken along a plane indicated by line 5—5 in FIG. 3.

Referring particularly to FIGS. 3, 4 and 5, the first end 24 includes a pair of longitudinally extending slots 40. A hollow coupling 42 having first and second ends and defining a longitudinal axis of rotation is disposed about the first end 24. The first end of the coupling 42 is adapted to be connected indirectly to the drive motor 16 while the second end is adapted to be connected to the first end 24. A pair of keys 44 are disposed within the opening defined by the coupling 42 and are in engagement with the coupling 42. The keys 44 have longitudinal axes that are aligned with the longitudinal axis of the coupling 42. A compression means for urging the keys 44 into contact with the shaft 15 is provided. The compression means is carried by the coupling 42 and, as illustrated, are in the form of set screws 46 that are threaded through openings formed in the side wall of the coupling 42.

A retaining means for urging the keys 44 out of contact with shaft 15 also is provided. The retaining means is carried by the coupling 42 and, as illustrated, is in the form of a bolt 48 that is threaded into an opening formed in the keys 44 and through an unthreaded opening formed in the side wall of the coupling 42. A spring 50 is disposed about the bolt 48 and intermediate the head of the bolt 48 and the outer surface of the coupling 42. The spring 50 urges the bolt 48 radially outwardly of the coupling 42. It will be apparent that the spring 50 is weaker than the set screws 46 such that, upon actuation of the screws 46, the keys 44 are brought into contact with the shaft 15 but, upon release of the screws 46, the keys 44 are brought out of contact with the shaft 15 and retained in place relative to the coupling 42.

Figure 2:
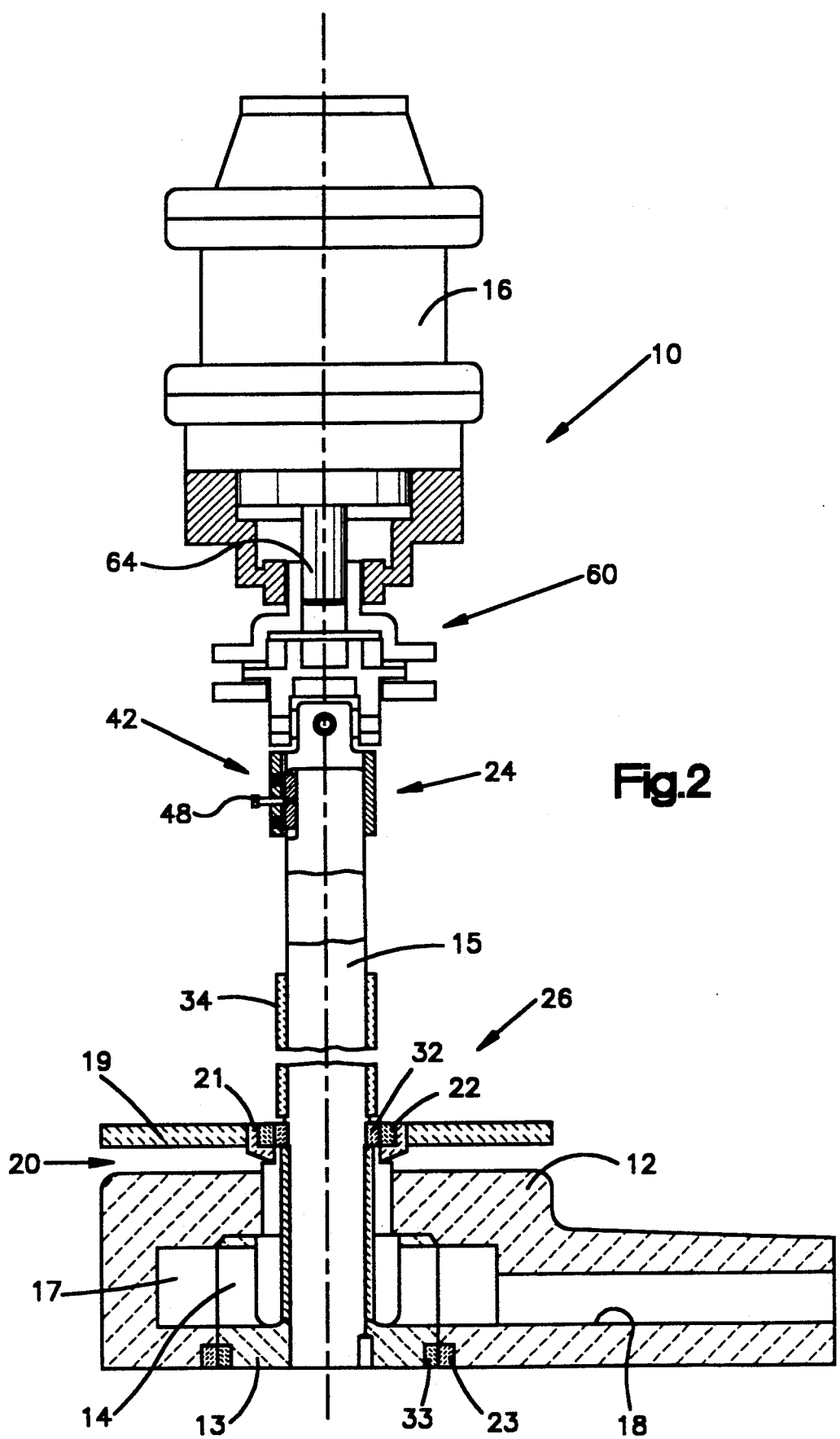
FIG. 2 is a cross-sectional view of the impeller shaft and drive system of the pump of FIG. 1.

Referring particularly to FIGS. 2, 5, and 6, a torque limiter 60 is disposed intermediate the motor 16 and the coupling 42. The torque limiter 60 includes an input hub 62 connectable to a drive shaft 64 of the drive motor 16. An output hub 66 is connectable to the coupling 42 by means of a block 68 through which a radially projecting drive pin 70 extends. The pin 70 engages openings 71 formed in ears 72 included as part of the output hub 66. A pair of shorter pins 73 (indicated by the dashed lines in FIGS. 3 and 5) extend out of the block 68 at right angles to the pin 70. The pins 73 engages openings 74 formed in ears 75 included as part of the coupling 42. The pins 70, 73 are supported by bronze bushings 76. Together, the block 68 and the pins 70, 73 form a universal joint that permits the shaft 15 to flex relative to the output hub 66.

The output hub 66 includes a radially extending, circumferential disc 77. Friction-creating material 78 is disposed on each side of the disc 77. The input hub 62 is in contact with the friction-creating material 78 on one side of the disc 77, and a pressure plate 80 is in contact with the friction-creating material 78 on the other side of the disc 77. The input hub 62 is connected to the plate 80 by means of bolts 81. A spring 82 is disposed about each bolt 81 and is retained there by a snap ring 83. The other end of the spring 82 bears against the upper surface of the input hub 62. By this technique, the springs 82 compress the hub 62 and the plate 80 against the friction creating material 78, which in turn is compressed against the disc 77.

A retainer plate 84 is disposed about the hub 62 on that side of the hub 62 closest to the motor 16. The plate 84 is connected to the plate 80 by means of spacer nuts 86, bolts 88, and torque pins 90. The torque pins 90 extend through openings 91 formed in the hub 62 and openings 92 formed in the pressure plate 80. The bolts 88 and the torque pins 90 are threaded into the spacers 86. The torque pins 90 prevent the plate 80 from rotating relative to the hub 62. A bearing 94 is disposed intermediate the central portions of the hubs 62, 66.

The torque limiter 60 has a number of desirable features. The number and strength of the springs 82 can be selected so that variable torque limits can be attained. It is expected that the springs can be color-coded so that the user will be able to quickly identify the strength of the springs, and the resultant torque limits of the torque limiter 60. The friction-creating material 78 is exposed to view, and therefore can be checked easily. Because the torque limiter 60 is bolted together, it is tamper-resistant and does not require torque adjustments during installation or operation. The coupling 42 and the output hub 66 have extremely low inertia, resulting in superior torsional overload control. In the event of an overload, the torque limiter 60 can be reused as soon as the jam has been cleared. Unlike shear pin-type torque limiters, no resettings or parts replacements are needed to resume operation after an overload has been encountered; this is an important consideration in view of the high temperature environment in which the torque limiter 60 must operate.

Figure 10:
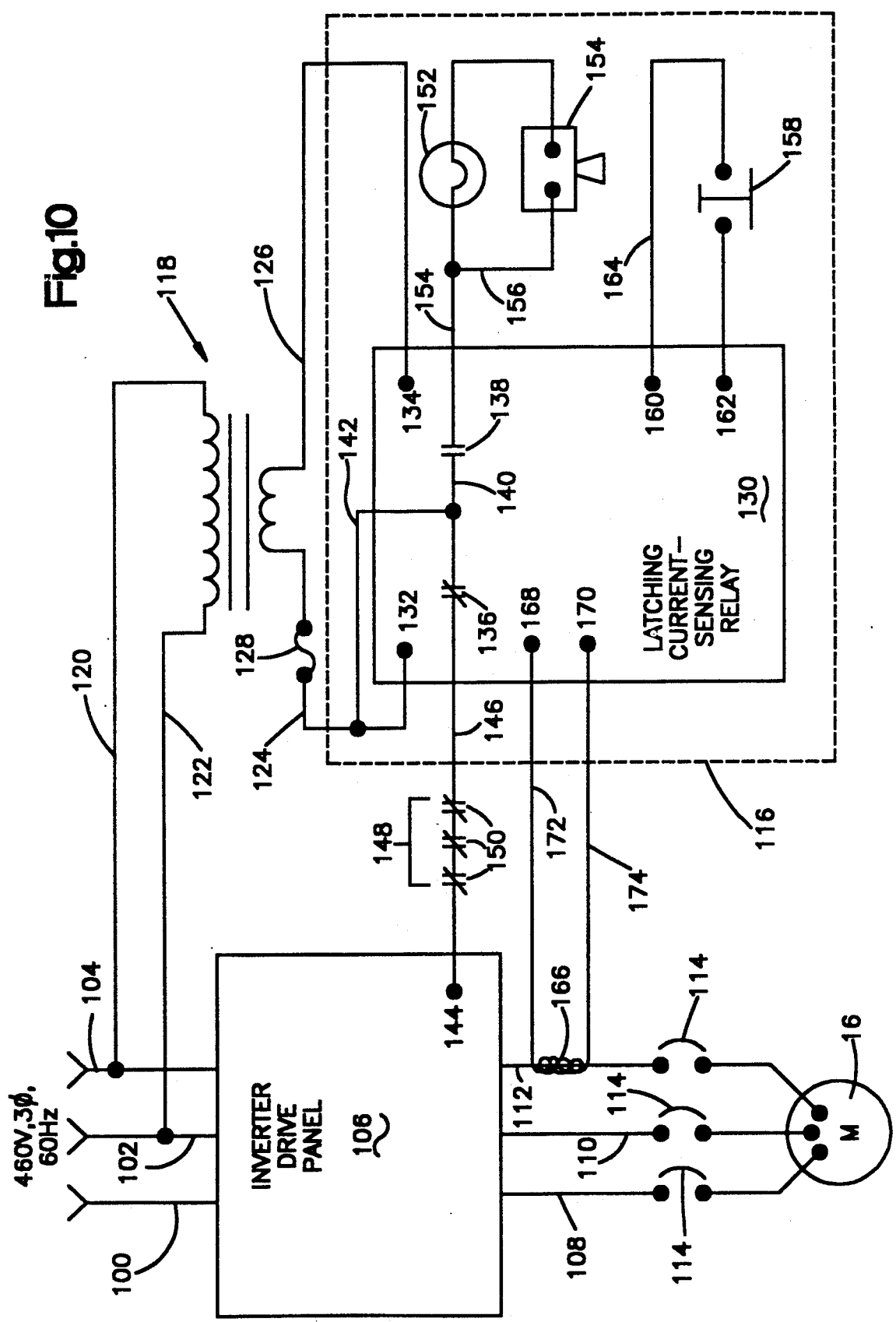
FIG. 10 is a schematic representation of electrical circuitry according to the invention.

If the drive motor 16 is an electric motor, the control circuitry for the motor 16 can be adapted easily to add a current sensor to sense when the motor 16 has been stalled. Referring particularly to FIG. 10, a portion of the electrical circuitry employed to operate the motor 16 is shown. The circuitry includes lead lines 100, 102, 104 that provide a 460-volt, three-phase, 60 Hertz electrical current to an inverter drive panel 106. Lead lines 108, 110, 112 are connected between the panel 106 and the motor 16. An overload coil 114 is connected in series in each of the lead lines 108, 110, 112.

A torque limiter circuit 116 is powered by a control transformer 118 that is connected across the lead lines 102, 104 by means of lead lines 120, 122. The secondary side of the transformer 118 is connected to the circuit 116 by means of lead lines 124, 126. A fuse 128 is connected in series in the lead line 124. The circuit 116 includes a latching current-sensing relay 130 that is connected to the lead lines 124 by means of terminals 132, 134, respectively. The relay 130 is commercially available from Syrelec Corporation of Dallas, Tex., 75234, model number LIRT 120AC. The relay 130 is a current-sensing relay that is energized whenever electrical current reaches a preselected value. The relay 130 stays locked until reset. The relay 130 is adjustable both for hysteresis and threshold current activation.

The relay 130 includes normally closed contacts 136 and normally open contacts 138. A lead line 140 connects the contacts 136, 138 and itself is connected to the lead line 124 by means of a lead line 142. The contacts 136 are connected to a terminal 144 included as part of the panel 106 by means of a lead line 146 and an overload relay 148 having normally closed contacts 150.

A visual alarm in the form of a lamp 152 is connected to the normally open contacts 138 by means of a lead line 154. An aural alarm in the form of a horn 154 is connected in parallel with the lamp 152 by means of a lead line 156. A reset button 158 is connected to terminals 160, 162 included as part of the relay 130 by means of a lead line 164. A current transformer 166 is connected to terminals 168, 170 included as part of the relay 130 by means of lead lines 172, 174.

In operation, a stall will occur whenever a particle of dross or other foreign object (or build up of material) becomes trapped by the impeller 13, and the torsional limit of the torque limiter 60 is exceeded. If the jam occurs quickly enough, it is possible that the torque limiter 60 will enable the impeller 13 to power through the jam. If the jam occurs more slowly, the motor 16 probably will stall. Any time the torsional limit of the torque limiter 60 is exceeded for more than a fraction of a second, a current sensor included as part of the inverter drive panel 106 will sense a sharp increase in current being drawn by the motor 16 and will activate the relay 148 so as to discontinue motor rotation instantly. Simultaneously, the current transformer 166 will activate a current sensor included as part of the relay 130 that is connected across the terminals 168, 170. Thereafter, the contacts 136 will open and the contacts 138 will close. In turn, the aural and visual alarms 152, 154 will be activated indicating to the user that pump operation has been discontinued automatically. Before restarting the system, the source of the jam must be identified and cleared. The reset push button 158 must be pushed to reset the relay 130, including the aural and visual alarm contacts 136, 138. As noted previously, due to the particular construction of the torque limiter 60, it is not necessary to reset any of the mechanical hardware.

Tests have been conducted with the components connected as illustrated in FIG. 2. A conventional threaded graphite shaft is able to sustain approximately 150 foot-pounds of static torque before fracturing. By use of the present invention, a shaft of similar diameter can withstand approximately 320 foot-pounds of static torque before fracturing. Because of the increased strength capability of the impeller shaft 15, the torque limit of the torque limiter 60 can be set at about 200 foot-pounds. The enhanced strength capability of the drive system according to the invention represents a significant improvement over conventional graphite shaft drive systems, and it enables the pump 10 to operate for a much longer time in conditions that would have produced catastrophic shaft failure with conventional impeller shafts and drive systems.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. An impeller shaft assembly for connection to a drive motor, comprising:
    an elongate shaft having first and second ends, the first end adapted to be connected to the drive motor and the second end adapted to receive an impeller, the second end of the shaft being generally cylindrical;
    an impeller adapted to be connected to the second end of the shaft, the impeller including a generally cylindrical opening into which the second end of the shaft can be placed;
    longitudinally extending openings formed in the impeller and the second end of the shaft at the interface between the second end and the impeller;
    dowels disposed within the openings formed in the impeller and the shaft; and
    refractory cement disposed intermediate the second end of the shaft and the impeller.

2. The shaft assembly of claim 1, further comprising a bearing ring disposed about the shaft intermediate the first and second ends, the ring being axially fixed relative to the shaft; and
    a sleeve disposed about the shaft adjacent the second end of the shaft, the sleeve being in contact with the ring at one end and the impeller at the other end.

3. The shaft assembly of claim 1, wherein the first end is generally cylindrical, and includes a longitudinally extending slot formed on its outer surface.

4. The shaft assembly of claim 1, further comprising a torque coupling system for the shaft, said torque coupling system including:
    a hollow coupling having first and second ends and defining a longitudinal axis of rotation, the first end adapted to be connected to the drive motor and the second end adapted to be connected to the first end of the shaft, the second end defining a generally cylindrical opening into which the shaft can be fitted;
    a key disposed within the opening and in engagement with the coupling, the key having a longitudinal axis that is aligned with the longitudinal axis of the coupling;
    compression means for urging the key into contact with the shaft, the compression means being carried by the coupling; and
    retaining means for urging the key out of contact with the shaft, the retaining means being carried by the coupling, the retaining means being weaker then the means for urging whereby, upon actuation of the compression means, the key is brought into contact with the shaft but, upon release of the compression means, the key is brought out of contact with the shaft and retained in place relative to the coupling.

5. The shaft assembly of claim 1, further comprising a universal joint disposed intermediate the drive motor and the first end of the shaft.

6. The shaft assembly of claim 5, wherein the universal joint is in the form of a block having first pins projecting from opposite sides thereof, the first pins being connected to a selected one of the motor or the first end, and second pins projecting from opposite sides of the block, the second pins being connected to the other of the motor or the first end, the first and second pins being disposed at right angles to each other.

7. An impeller shaft assembly for connection to a drive motor, comprising:
    an elongate shaft having first and second ends, the first end adapted to be connected to the drive motor and the second end adapted to receive an impeller, the second end of the shaft being generally cylindrical;
    an impeller adapted to be connected to the second end of the shaft, the impeller including a generally cylindrical opening into which the second end of the shaft can be placed;
    longitudinally extending openings formed in the impeller and the second end of the shaft at the interface between the second end and the impeller;
    dowels disposed within the openings formed in the impeller and the shaft; and
    a torque coupling system for the shaft, said torque coupling system including:
    a hollow coupling having first and second ends and defining a longitudinal axis of rotation, the first end adapted to be connected to the drive motor and the second end adapted to be connected to the first end of the shaft, the second end defining a generally cylindrical opening into which the shaft can be fitted;

a key disposed within the opening and in engagement with the coupling, the key having a longitudinal axis that is aligned with the longitudinal axis of the coupling;

compression means for urging the key into contact with the shaft, the compression means being carried by the coupling; and retaining means for urging the key out of contact with the shaft, the retaining means being carried by the coupling, the retaining means being weaker then the means for urging whereby, upon actuation of the compression means, the key is brought into contact with the shaft but, upon release of the compression means, the key is brought out of contact with the shaft and retained in place relative to the coupling.

8. The shaft assembly of claim 7, further comprising refractory cement disposed intermediate the second end of the shaft and the impeller.

9. The shaft assembly of claim 7, further comprising a bearing ring disposed about the shaft intermediate the first and second ends, the ring being axially fixed relative to the shaft; and a sleeve disposed about the shaft adjacent the second end of the shaft, the sleeve being in contact with the ring at one end and the impeller at the other end.

10. The shaft assembly of claim 7, wherein the first end of the shaft is generally cylindrical, and includes a longitudinally extending slot formed on its outer surface, the slot being engageable with the key disposed within the opening in the coupling.

11. The shaft assembly of claim 7, further comprising a universal joint disposed intermediate the drive motor and the first end of the coupling.

12. The shaft assembly of claim 11, wherein the universal joint is in the form of a block having first pins projecting from opposite sides thereof, the first pins being connected to a selected one of the motor or the first end of the coupling, and second pins projecting from opposite sides of the block, the second pins being connected to the other of the motor or the first end of the coupling, the first and second pins being disposed at right angles to each other.

* * * * *